United States Patent [19]

Evans

[11] Patent Number: 4,475,412

[45] Date of Patent: Oct. 9, 1984

[54] INFINITE SPEED POWER TRANSMISSION WITH SHIFTABLE GEAR PLATES

[76] Inventor: Lyle B. Evans, 9135 SW. Summerfield Ct., Tigard, Oreg. 97223

[21] Appl. No.: 501,870

[22] Filed: Jun. 7, 1983

[51] Int. Cl.³ .................... F16H 29/08; F16H 29/20; F16H 27/02; F16H 21/40
[52] U.S. Cl. ........................................... 74/119; 74/121; 74/132; 74/63
[58] Field of Search .................. 74/63, 121, 119, 55, 74/29, 30, 570, 132, 135

[56] References Cited

U.S. PATENT DOCUMENTS

| | | | |
|---|---|---|---|
| 546,055 | 9/1895 | Pitt | 74/567 X |
| 1,050,226 | 1/1913 | Nixon | 74/55 |
| 1,090,401 | 3/1914 | Lea | 74/55 |
| 1,257,479 | 2/1918 | Grant | 74/121 |
| 1,739,554 | 12/1929 | Lindholm | 74/121 |
| 1,988,571 | 1/1935 | Rider | 74/570 |
| 2,109,174 | 2/1938 | Kalko | 74/119 |
| 2,936,632 | 5/1960 | Palmer | 74/55 |
| 3,046,804 | 7/1962 | Mackintosh | 74/120 |
| 3,233,472 | 2/1966 | Canalizo et al. | 74/132 |
| 3,427,888 | 2/1969 | Rheinlander | 74/55 |
| 3,459,056 | 8/1969 | Lea | 74/29 |
| 3,490,299 | 1/1970 | Binner | 74/63 |
| 3,777,581 | 12/1973 | Sartori | 74/29 X |
| 3,913,749 | 10/1975 | Wyers | 74/63 |
| 4,411,165 | 10/1983 | Evans | 74/63 |

Primary Examiner—Allan D. Herrmann
Assistant Examiner—Stephen B. Andrews
Attorney, Agent, or Firm—James D. Givnan, Jr.

[57] ABSTRACT

An infinite speed transmission having aligned input and output shafts with the input shaft driving a pair of eccentrics each of which oscillates an arm which in turn drives a gear plate housing in a rectilinear manner. Each gear plate housing slidably carries a gear plate equipped with multiple gear racks which drive a pinion gear mounted on the transmission output shaft. Gear plate and pinion engagement for unidirectional rotation of the pinion gear is controlled by a cam which shifts the gear plates within their respective housing. Speed changes are effected by relocating the eccentric driven arms relative the gear plate housings driven by the arms. Repositioning of the cam results in the output shaft mounted pinion being driven in a reverse direction.

8 Claims, 7 Drawing Figures

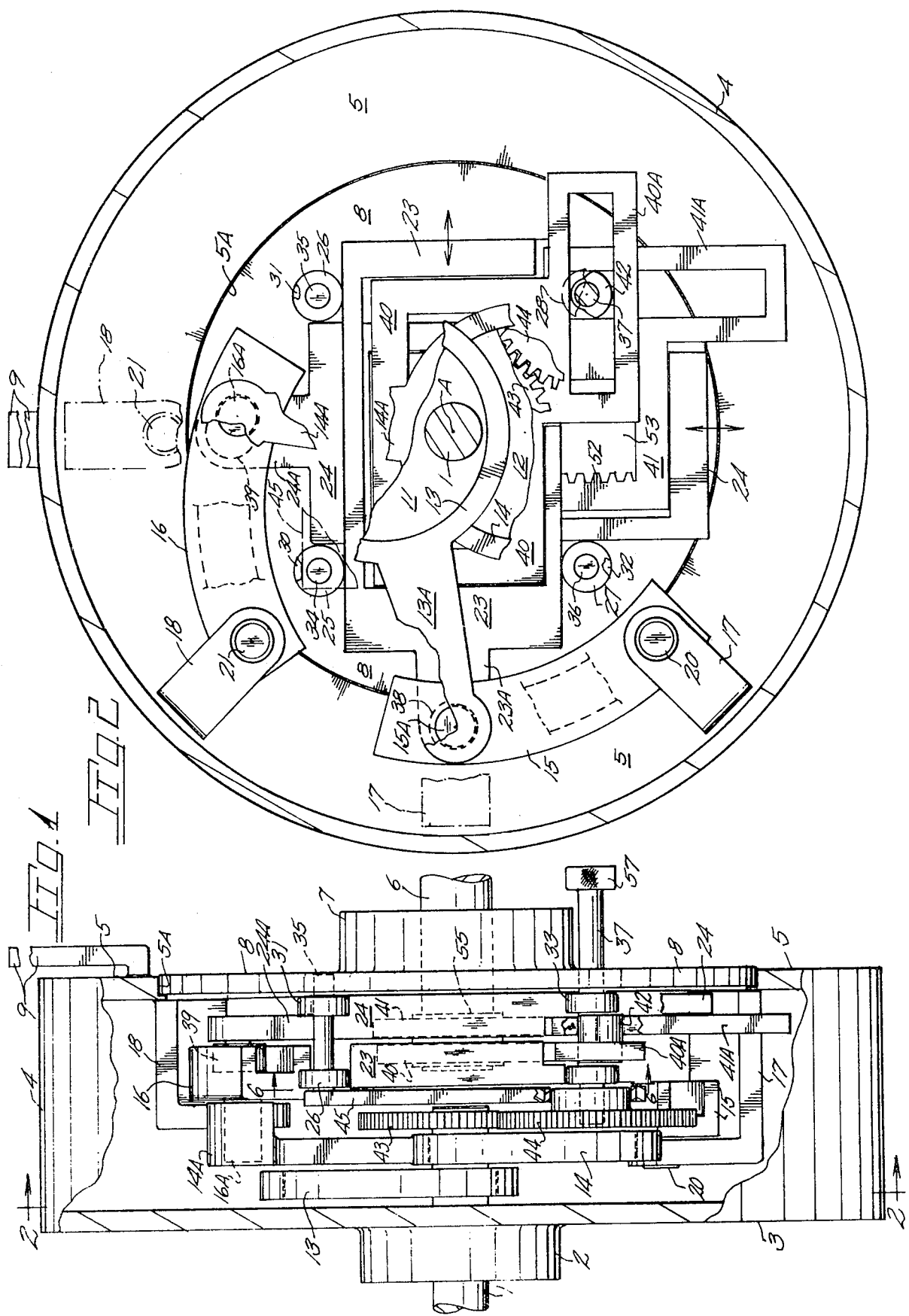

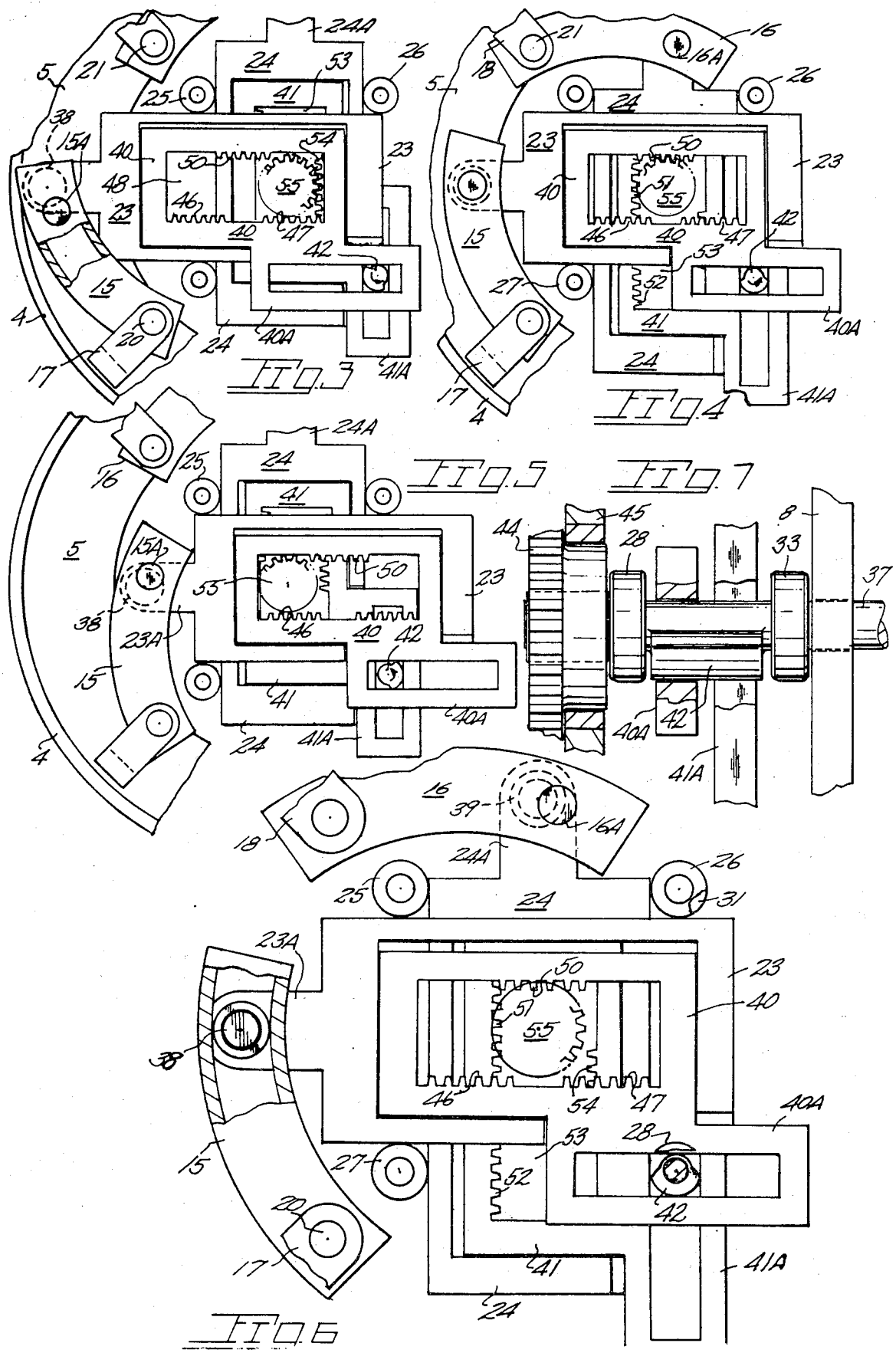

INFINITE SPEED POWER TRANSMISSION WITH SHIFTABLE GEAR PLATES

BACKGROUND OF THE INVENTION

The present invention pertains generally to transmissions of the type providing an infinite number of ratios between its input and output shafts.

The present transmission utilizes oscillatory arms driven by eccentrics as does a transmission disclosed in my copending U.S. patent application filed under Ser. No. 06/416,885 and entitled INFINITE SPEED TRANSMISSION WITH RECIPROCATING YOKES and which transmission included a number of unidirectional clutch assemblies which are not utilized in the present transmission.

In the known prior art, U.S. Pat. No. 3,427,888 discloses a transmission wherein a pair of gear racks drive clutch equipped gears carried by an output shaft. Rectilinear movement is imparted to the gear racks by cams the eccentricity of which may be varied to impart strokes of different lengths to the reciprocating gear racks. According to the patent disclosure, the input and output shafts of the transmission are necessarily offset. A further drawback is that the transmission does not lend itself to enclosure within a housing of practical size.

U.S. Pat. No. 546,055 discloses a steam engine having driven cams carried by a common shaft with each cam rotating in a separate yoke to impart rotation to the cam equipped output shaft.

U.S. Pat. No. 2,936,632 discloses a device for driving the pistons of a machine such as an air compressor which utilizes eccentrics and yoke structures disposed perpendicularly to one another.

U.S Pat. No. 1,050,226 discloses the concept of a cam actuated rod coupled to a yoke on which parallel rows of gear teeth sequentially drive an output shaft via a pair of unidirectional clutches.

U.S. Pat. No. 3,459,056 discloses a transmission wherein a pair of gear racks move in rectilinear alternating fashion to drive a crank equipped output shaft.

SUMMARY OF THE PRESENT INVENTION

The present invention is embodied in a transmission with an infinite speed capability wherein arm driven gear plates alternately engage and drive an output shaft. The gear plates are positioned into and out of engagement with said shaft during each shaft rotation to impart unidirectional rotation thereto.

Eccentrics mounted on the transmission input shaft serve to oscillate a pair of arms which in turn reciprocate gear plate housings and a gear plate therein carried by each housing past an output shaft pinion gear. Each gear plate in addition to lengthwise travel past the pinion gear is shifted in its housing to also drive the pinion during return of the gear plate back to its starting position. Accordingly, the gear plates move in rectangular paths to alternately drive the output shaft. A cam acts on the gear plates to shift same within their respective housings.

The oscillating arms which drive the gear rack housings are carried by an arcuately shiftable member. Movement of the adjustable member serves to locate the axis of each oscillating arm relative to a gear plate housing. Each gear plate housing has an end in slidable engagement with an oscillating arm and as the arm is positioned by the shift ring toward or away from its gear plate housing the transmission ratio will vary by reason of housing linear travel being decreased or increased.

Important objectives of the present transmission include the provision of an infinite speed transmission having gear components in positive engagement with one another to avoid the drawbacks of pliable or belt power transmission components; the provision of a transmission which dispenses with internal clutch assemblies to increase reliability and effect a lower cost of manufacture; the provision of a transmission with gear plates that may be repositioned by a settable cam to effect a reverse drive.

BRIEF DESCRIPTION OF THE DRAWINGS

In the drawings:

FIG. 1 is a side elevational view of the transmission with fragments of a transmission case broken away;

FIG. 2 is a vertical sectional view taken approximately along line 2—2 of FIG. 1;

FIGS. 3, 4 and 5 are vertical sectional views similar to FIG. 2 but on a greatly reduced scale showing gear plates and their housing during one stroke;

FIG. 6 is a vertical sectional view taken along line 6—6 of FIG. 1; and

FIG. 7 is a side elevational view of a cam and cam follower fragments.

DETAILED DESCRIPTION OF THE PREFERRED EMBODIMENT

With continuing attention to the drawings wherein applied reference numerals indicate parts hereinafter similarly identified, the reference numeral 1 indicates a power input shaft journaled within a suitable bearing in a boss 2 formed in a transmission case 3.

Case 3 is of circular configuration having an outer wall 4 and a rear wall 5. An output shaft 6 is journaled within a bearing assembly within a cup 7 on a base plate 8. The input and output shafts have aligned axes.

Input shaft 1 carries eccentrics at 11 and 12 with eccentric followers at 13 and 14 having integral pitmans at 13A and 14A. The eccentrics are diametrically offset from axis A of input shaft 1 while the pitmans travel along paths generally perpendicular to one another.

The case rear wall 5 is shouldered at 5A to receive plate 8 in a rotatable manner. A transmission control arm is at 9.

Each pitman drives an oscillatory arm at 15 and 16 with the pitman ends being coupled to arm mounted posts 15A and 16A. The arms 15 and 16 are carried by supports at 17 and 18 which in turn are secured in place to rear wall 5 of case 3 to move therewith during ratio changes. Each oscillating arm 15 and 16 includes a stub shaft at 20 and 21 about the axis of which each arm oscillates in response to the eccentrically driven pitmans. Each arm is of channel section as later elaborated upon.

Each arm 15 and 16 serves to impart rectilinear motion to gear plate housings indicated at 23 and 24 along fixed paths and do not move in a rotational manner during rotational movement of the case and the oscillatory arms carried thereby. The gear plate housings 23 and 24 move in perpendicularly orientated rectilinear paths under the influence of the oscillatory arms.

Horizontal gear plate housing 23 is confined for horizontal movement by a first set of guide rollers at 25, 26, 27 and 28 while second or vertical gear plate housing at 24 is confined for vertical travel by a second set of guide rollers at 30, 31, 32 and 33. Each roller is suitably carried by bearing means on posts at 34, 35, 36 and 37 in place on stationary rear base plate 8 forming part of the transmission case.

With attention again to the gear plate housings 23 and 24, each is generally of rectangular, planer shape having an end appendage at 23A-24A which is provided with a pintle at 3B and 39 which are received respectively in a channel of each oscillating arm. During a ratio change the axes of rotation of the oscillatory arms are moved toward or away from the gear plate housing pintles 38 and 39 to vary the linear stroke of each housing with the stroke diminishing as the arm axis of rotation is advanced toward its respective cooperating pintle. A neutral condition is reached when the stub shafts 20 and 21, carrying arms 15 and 16, are positioned into alignment with pintles 38-39 as per the broken line position of arm supports 17 and 18 in FIG. 2.

Slidably disposed within each gear plate housing 23-24 is a gear plate 40 and 41 also of generally planer, rectangular shape with each plate having a cam follower portion 40A-41A projecting from the respective gear plate housings so as to engage a cam 42 which imparts engaging-disengaging shifting movement to the gear plates as later described. Cam rotation is by means of a pair of timing gears at 43-44 one of which is carried by power input shaft 1. The remaining timing gear is journaled within a stationary plate 45 supported at the outer ends of posts 34, 35, 36 and 37 which additionally serve to carry the guide rollers as earlier noted. Cam 42 as driven by the timing gears rotates at the same speed as input shaft 1 and acts on the follower portion of each gear plate to shift gear plate 40 up and down as viewed in FIG. 2 and shift gear plate 41 horizontally within their respective gear plate housings with one cycle of vertical and horizontal travel occurring with each rotation of the input shaft.

With attention again to the gear plates 40-41, the same are equipped with internal gear racks as follows. Plate 40 has paired gear racks 46 and 47 on one side of a gear plate opening 48 with an opposed gear rack at 50. Plate 41 has a pair of gear racks 51 and 52 on one side of a gear plate opening 53 with an opposed gear rack 54 on the opposite side of the opening.

Enmeshable with the above gear racks is a pinion gear 55 suitably keyed to the inner end of output shaft 6 of the transmission. Gear 55 is of a length to be sequentially engaged by the gear racks of both gear plates as the gear plates move in their quadrangular paths under the joint influence of their gear plate housings and cam 42.

With each half rotation of power input shaft 1 an oscillating arm will make one unidirectional stroke. The magnitude of the gear plate housing stroke as induced by an arm will vary depending on the proximity of the arm pivot point to the housing appendage as earlier noted. During the above mentioned stroke, the gear plates will move along a single vector so as to cause either the paired gear racks thereon or the opposed gear rack thereon to engage the output shaft pinion. At the completion of said stroke and coincident with rotation of the input shaft through 180 degrees rotating cam 42 will relocate the gear plate within its housing for pinion engagment of the gear rack teeth on the remaining side of the gear plate opening. Accordingly, the gear plates follow a quadrangular path to impart unidirectional rotation to the output shaft pinion. At the extremes of gear plate travel, as for example in FIG. 5, the pinion is disengaged from the rack teeth of gear plate 40 while the rack teeth on gear plate 41 remain in mesh with the pinion to avoid simultaneous disengagement of the pinion from both gear plates.

Opposite rotation or reverse of the output shaft is effected by repositioning of a control 57 and attached cam 42 through 180 degrees to cause the gear plates to shift within their respective housings so as to cause a different series of gear plate teeth to engage the output shaft pinion during a stroke of the gear plate housing and its gear plate.

A neutral condition of the transmission is achieved by the rotational positioning of case 3 by control 9 which swings both arm supports 17 and 18 to the broken line position of FIG. 2. Each arm axis of rotation will now be in axial alignment with a pintle 38-39. While arms 15 and 16 will continue to oscillate in response to the eccentrics, the gear plate housing will remain stationary with no motion occurring between each gear plate and the output shaft mounted pinion. A low ratio between input and output shaft speeds occurs when the rotational axes of arms 15 and 16 are located proximate the gear housing pintles 38 and 39. Conversely, a high ratio of input to output shaft speeds occurs with the shifting of arms 15 and 16 to locate the arm ends adjacent the gear plate housing pintles.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A transmission comprising in combination,
   a case,
   input and output shafts,
   arms pivotally mounted in said case for oscillation about spaced apart arm axes,
   arm supports, positionable within said case,
   means mounting said arm supports permitting rotational positioning of same,
   control means for positioning said mounting means and said arm supports and the arm axes,
   eccentric means driven by said input shaft and imparting oscillatory movement to said arms,
   gear plate housings supported for rectilinear travel within said case,
   said arms imparting rectilinear movement to said gear plate housings,
   gear plates one each slidably disposed within a gear plate housing for relative movement thereto, each of said gear plates having multiple sets of rack gear teeth for engagement with an output shaft mounted pinion,
   cam means acting on said gear plates to shift same within their respective housings so as to locate a set of sets of rack gear teeth thereon for enmeshing travel past said pinion to drive the output shaft, and
   speed changes between said input and output shafts occurring as the magnitude of gear plate housing travel is altered by the relocating of the arm axes toward or away from the gear plate housings to vary effective arm throw by changing the point of contact between said arms and their respective gear plate housings.

2. The transmission claimed in claim 1 wherein said arms are of channel section, said gear plate housings each having an end mounted appendage in seated sliding engagement with one of each of said arms whereby the arm imparts two stroke rectilinear movement to the housing.

3. The transmission claimed in claim 2 wherein each housing appendage has a pintle received within the channel section of an arm, each of said arm axes when aligned with the pintle of its associated gear plate housing effecting a neutral condition whereat no motion is imparted to the gear plate housings by the arms.

4. The transmission claimed in claim 1 wherein said cam means is driven by said input shaft and operable during each rotation of the input shaft to reposition the gear plates to their extremes of travel within their respective gear plate housings.

5. The transmission claimed in claim 4 wherein each of said gear plates has a cam follower portion located exteriorly of the respective gear plate housing.

6. The transmission claimed in claim 1 wherein said cam means is repositionable to alter gear rack and pinion engagement during each stroke of the gear plate housing to effect reverse rotation of the pinion.

7. The transmission claimed in claim 6 additionally including timing gears driven by said input shaft and imparting rotation to said cam means.

8. The transmission claimed in claim 1 wherein each of said gear plates includes gear racks in alignment with one another, an opposed gear rack, said gear plate moving in a linear manner during each stroke of gear plate housing travel so as to engage the paired gear racks with the pinion or alternatively the opposed gear rack with said pinion.

* * * * *